Jan. 26, 1954

J. AMOUR 2,667,086

NO-SPIN DIFFERENTIAL

Filed Oct. 16, 1950

Inventor
James Amour

By *Clarence A. O'Brien
and Harvey B. Jacobson*
Attorneys

Jan. 26, 1954   J. AMOUR   2,667,086
NO-SPIN DIFFERENTIAL
Filed Oct. 16, 1950   4 Sheets-Sheet 2

Inventor
James Amour

By *Clarence A. O'Brien
and Harvey B. Jacobson*
Attorneys

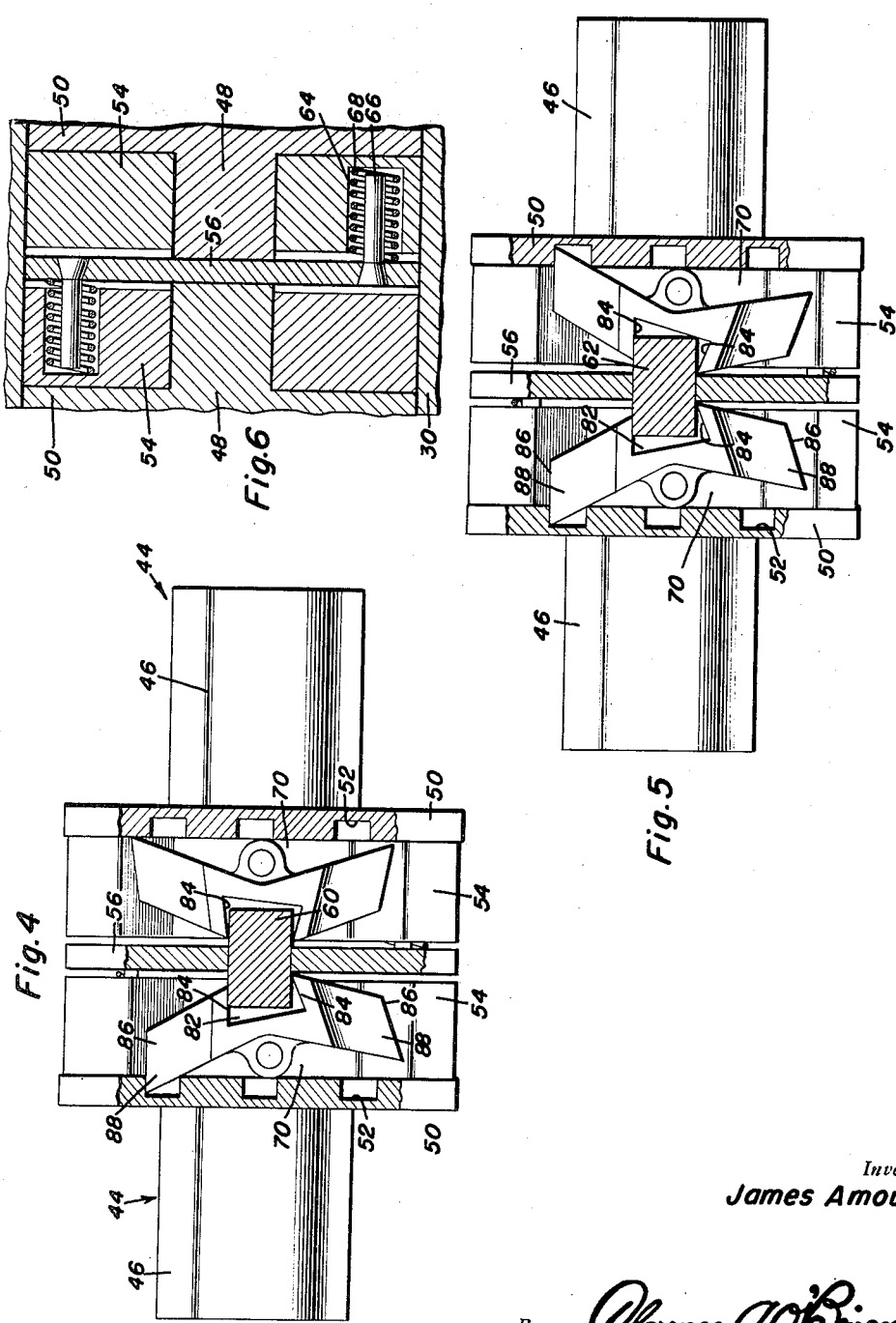

Jan. 26, 1954   J. AMOUR   2,667,086
NO-SPIN DIFFERENTIAL
Filed Oct. 16, 1950   4 Sheets-Sheet 4
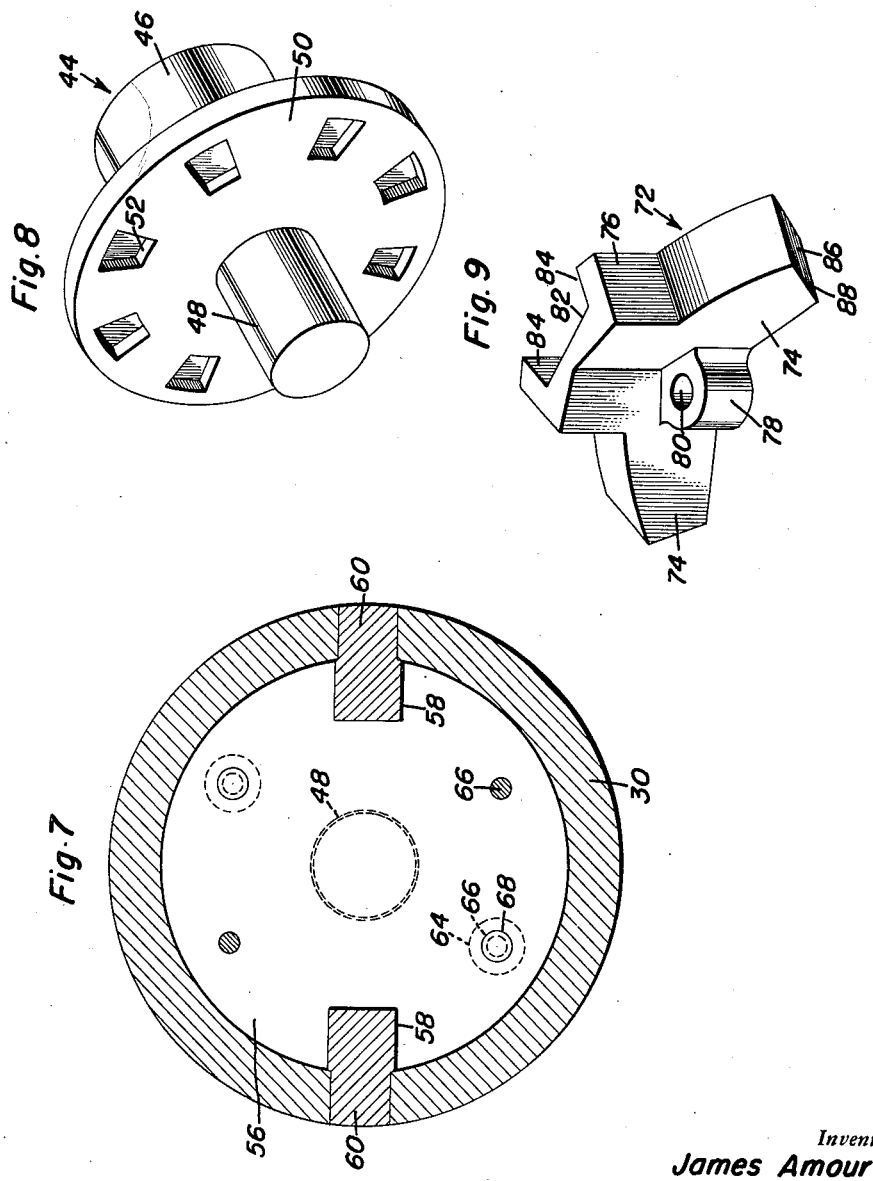
Inventor
James Amour Patented Jan. 26, 1954

2,667,086

UNITED STATES PATENT OFFICE 2,667,086

NO-SPIN DIFFERENTIAL

James Amour, Frackville, Pa.

Application October 16, 1950, Serial No. 190,422

4 Claims. (Cl. 74—650)

This invention comprises novel and useful improvements in a no-spin differential and more specifically pertains to an improved differential mechanism which obviates the use of spider gears and the like and the customary differential gears therein, while replacing the same with a positively acting overrunning clutch mechanism.

The principal object of this invention is to provide an improved differential mechanism and more particularly a differential mechanism adapted for use in automotive vehicles for connecting the propeller or drive shaft with the rear axles or driven shafts of the vehicle.

A further object of the invention is to provide a differential mechanism which shall provide a positive mechanical driving connection between the driving shaft and both of the axles for both forward and reverse directions of rotation of the latter, except when one of the axles rotates faster than the other, as when making a turn and the like.

A still further object of the invention is to provide a differential mechanism in conformity with the foregoing objects which shall overcome the known disadvantages of differential gearing such as spider gears and the like by replacing the same with a positively actuating overrunning or one-way clutch assembly.

These, together with various ancillary features and objects of the invention, which will later become apparent as the following description proceeds, are attained by the present invention, a preferred embodiment of which has been illustrated, by way of example only, in the accompanying drawings, wherein:

Figure 4 is a fragmentary sectional view through a portion of the overrunning clutch assembly showing one of the clutch elements in its axle-driving position, and the other clutch element in an overrunning position;

Figure 5 is a view similar to Figure 4 but showing both of the clutch elements for both of the clutch assemblies in their positive driving position;

Figure 1:
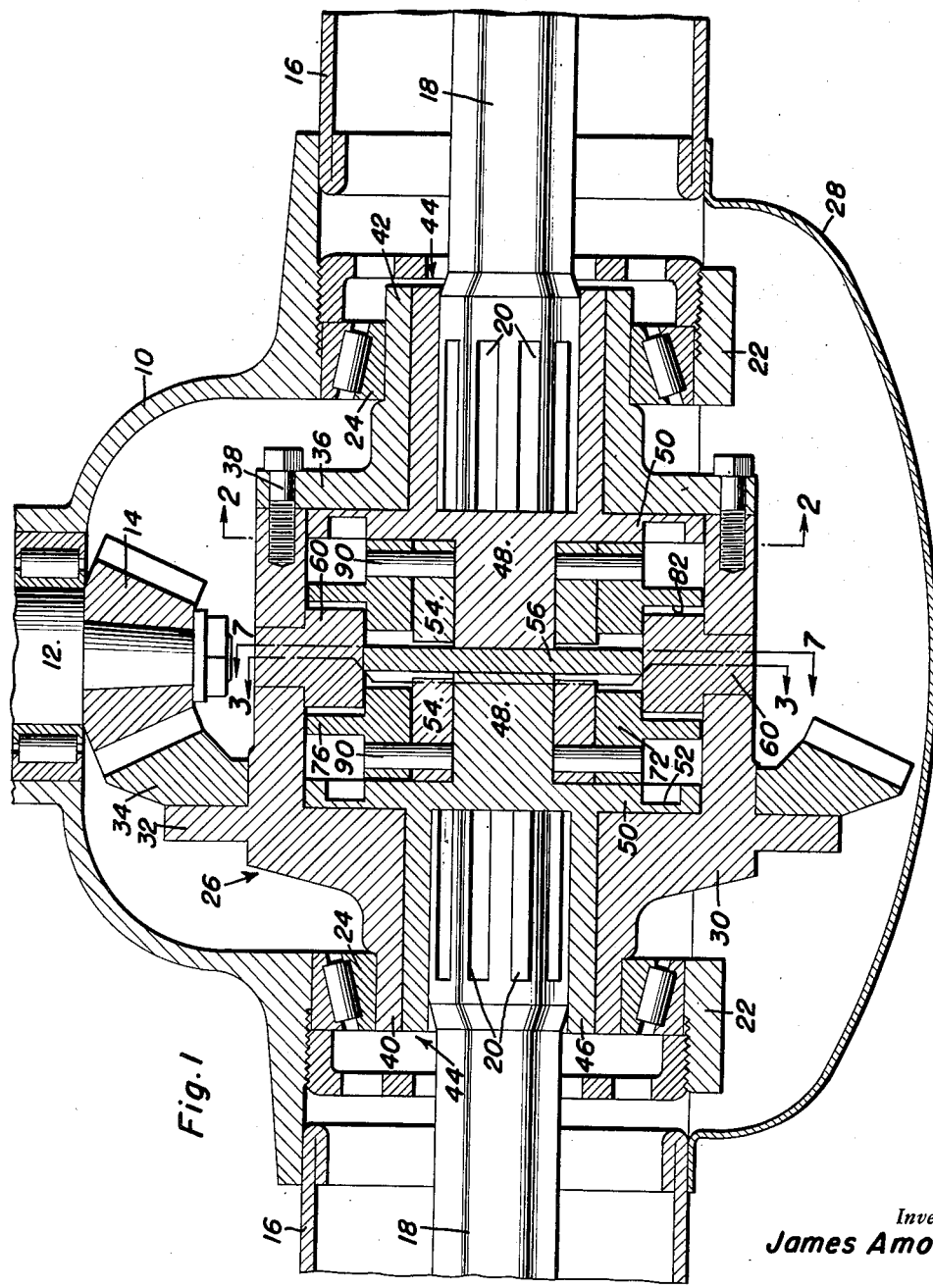
Figure 1 is a horizontal sectional view through a portion of an automobile differential assembly showing the differential mechanism of this invention incorporated therein.
Figure 3:
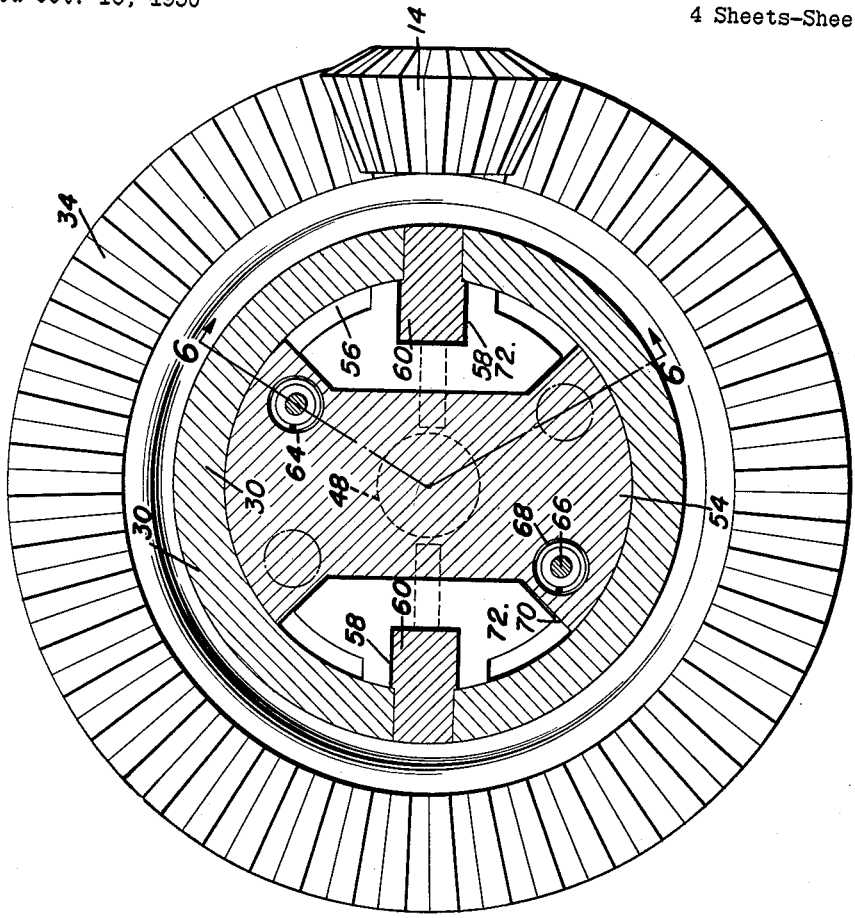
Figure 3 is a vertical transverse sectional view taken substantially upon the plane indicated by the broken section line 3—3 of Figure 1, and illustrating more particularly certain details of the overrunning clutch assembly of the invention.
Figure 2:
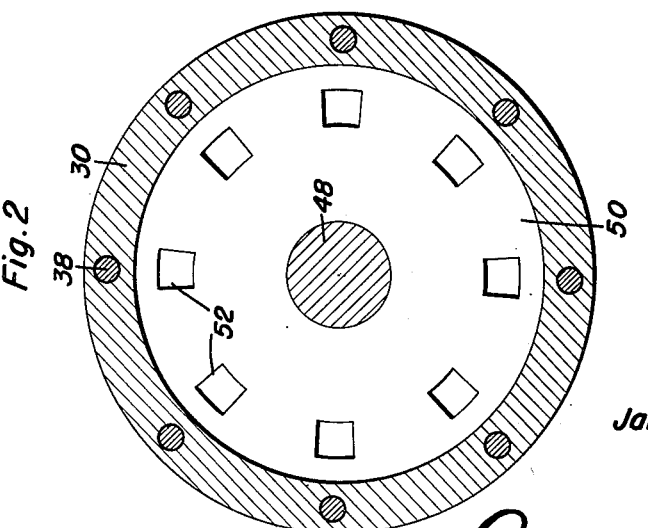
Figure 2 is a vertical transverse sectional view taken substantially upon the plane indicated by the section line 2—2 of Figure 1 and illustrating in particular one of the clutch plates forming a part of the invention.

Figure 6 is a sectional detail view taken substantially upon the plane indicated by the broken section line 6—6 of Figure 3 and illustrating in particular a resilient means urging the clutch elements into clutch-engaging position; and Figure 7 is a vertical transverse sectional view taken substantially upon the plane indicated by the section line 7—7 of Figure 1, and showing the manner in which a pressure plate is nonrotatably secured in the housing of the differential assembly;

Figure 8 is a perspective view of one of the clutch members forming a part of the invention; and Figure 9 is a perspective view of one of a plurality of clutch elements in accordance with this invention.

Referring now more specifically to the accompanying drawings, wherein like numerals designate similar parts throughout the various views, attention is directed first to Figure 1 wherein it will be seen that the invention is embodied in a portion of a conventional differential housing assembly of the rear axles of an automotive vehicle, the customary differential case being indicated at 10, while the rear portion of a drive shaft or propeller shaft of the vehicle is shown at 12 as journaled in and extending into the case 10 and is provided with the customary pinion gear 14. Secured in alignment in apertures in the opposite sides of the casing 10 are a pair of axle housing 16 in which are received the customary driven shafts or rear axles 18 of the vehicle, these axles being provided with splines 20 on their adjacent or inner ends by means of which rotation is imparted to the axles.

Likewise secured in suitable journals 22 within the casing 10 but at opposite sides thereof are differential thrust bearing assemblies 24 by means of which the differential mechanism forming the subject of this invention and designated generally by the numeral 26 is rotatably mounted and journaled within the differential casing 10.

A removable rear closure plate 28 is secured in any desired manner to the casing 10 to provide access to the interior of the same for servicing the parts of the differential assembly in a manner well understood in the art.

The differential mechanism 26 consists of a generally cylindrical or drum-like differential housing member 30 which is provided with a flange 32 to which is secured a ring gear 34 continuously in mesh with the driving pinion 14. The housing 30 is hollow, and is provided with a removable closure wall 36, detachably secured, as by fastening bolts 38.

The housing 30 and the closure wall 36 thereof are provided on opposite sides with oppositely disposed but aligned hub portions 40 and 42 which are rotatably journaled in the thrust bearings 24 and which, in turn, rotatively receive a pair of driven members each of which is designated generally by the numeral 44. The members 44 are of identical construction, and each consists of a sleeve-like hub portion 46 which is internally splined to receive the splines 20 of the axles 18, whereby the members 44 are fixedly but removably secured to the axles for driving the same. As will be readily apparent from Figure 1, the entire differential assembly 26 is retained within the differential casing 10, while the axles 18 are removably inserted into the differential assembly by an axial or endwise movement thereof.

The driven members 44 further include aligned, axially extending shaft or axle portions 48 which terminate in spaced relation to each other, while radially extending annular clutch plates 50 are disposed at the junction of the hubs 46 with the axle portions 48. These clutch plates bear against and turn against the inside surfaces of the housing 30 and its cover plate 36.

It will thus be apparent that the driven members 44 are non-rotatably secured to the inner ends of the aligned axles or driven shafts 18, while being rotatively received within the hub portions 40 and 42 of the housing 30 and the cover plate 36 thereof, these two latter members being in turn rotatively journaled within the differential casing 10 and continuously connected with the driving or propeller shaft 12 through the pinion and ring gear assembly 14 and 34.

A novel differential mechanism of the overrunning clutch or ratchet type of a construction to be now described is housed within the differential housing 30 and operatively connects the housing to the clutch plates 50 for driving the same with a differential motion, as set forth hereinafter.

Referring now more specifically to Figure 8, it will be apparent that the driven members 44 have their clutch plates 50 provided with a circumferentially disposed series of openings, notches or recesses 52 adapted to be engaged by clutch elements as set forth subsequently.

Disposed within the differential housing 30 are a pair of substantially cylindrical or drum-like bodies 54 having central apertures by which the same are freely rotatably journaled upon the axle portions 48 of the driven members 44. An annular disk comprising a pressure plate 56 is received within the housing 30 and disposed between the adjacent ends of the bodies 54 and the adjacent ends of the axles 48, the circumference or periphery of this pressure plate being disposed in closely spaced relation to the inner circumference or surface of the cylindrical or drum-like housing 30 as will be better apparent from Figure 7. However, at diametrically opposite points, the periphery of the pressure plate 56 is provided with radially disposed notches 58 and a pair of oppositely disposed, substantially T-shaped keys or connecting members 60 have their stem portions disposed in seats in the cylindrical wall of the housing 30, while their laterally extending arm portions extend into and extend laterally from the notches 58 as will be apparent from a consideration of Figures 1 and 7.

These keys or connecting members 60 fixedly secure the pressure plate 56 to the housing 30 for rotation therewith. At the same time, the laterally extending arm portions of the T-shaped connecting members constitute a driving and actuating means for the clutch elements in a manner to be more fully set forth hereinafter.

Referring now more particularly to Figure 6, it will be seen that the bodies 54 on their sides which are adjacent to the pressure plate are provided with pairs of diametrically or oppositely disposed chambers or recesses 64, while the pressure plate 56 is provided with pins 66 extending into and centrally of these chambers. Compression springs 68 surround the pins 66 and yieldingly urge the bodies 54 away from the pressure plate 56 and toward the clutch plates 50 which are adjacent to the respective bodies. The purpose of this construction will be subsequently apparent.

Referring now more particularly to Figures 1 and 3, it will be seen that each of the bodies 54 is provided upon diametrically opposed portions of its exterior surface with recesses 70 which extend across the entire width of the body and constitute notches or chambers in which are pivotally mounted clutch elements indicated generally by the numeral 72.

Referring now more particularly to Figure 9, it will be apparent that the elements 72 comprise ratchet levers having angularly inclined arms 74 together with a vertically raised central portion 76. Intermediate their extremities, the arms 74 are provided with laterally extending bosses 78 which are apertured as at 80 to provide journal bearings intermediate the ends of the levers and about which the levers pivot. The two arms 74 are disposed at an obtuse angle with respect to each other and the fulcrum or pivot boss 78 is disposed intermediate this obtuse angle, as will be apparent from Figure 9. Upon the opposite side of the ratchet lever 72 from the fulcrum boss 78 and also extending through the vertical portion 76 of the clutch element is a recess constituting a notch 82 having relatively outwardly converging side walls 84 which constitute cam surfaces, see Figures 4 and 5, as will be set forth hereinafter. It will now be apparent from Figures 4 and 5 that the notches 82 and the pivot bearing 80 of the boss 70 are disposed upon opposite sides of the ratchet lever or clutch elements 72. The opposite ends of the arms 74 are provided with flat surfaces 86 terminating in nose portions 88 which constitute ratchet teeth or clutch teeth at opposite ends of the clutch elements.

The clutch elements themselves are pivotally or oscillatably journaled upon pivot pins 90 which are mounted upon the bodies 54 and extend into the recesses 70 and are disposed radially of the body and radially with respect to the axis of rotation of the bodies.

It should be noted, by reference to Figure 1, that the lower surface of the T-shaped connecting members 60 overlie the levers 72 and are received in the notches 82 thereof, as shown in Figures 4 and 5. Further, the cam surfaces 84 of the notches 82 are so disposed that each surface will be alternatively engaged against an opposite side of the connecting member 60 when the corresponding nose or tooth of the ratchet lever is received in one of the ratchet openings of the clutch plate.

Since the clutch elements are pivotally mounted upon the bodies 54 which in turn are freely rotatable upon the axles 48 of the driven members 44, it will be apparent that a rotationally adjustable driving connection is established between the connecting members 60 of the rotating housing, the clutch elements and the clutch plates of the driven members.

It will be apparent from Figure 1 that substantially no lateral movement is possible between the aligned axles 48 by virtue of the pressure plate 56 interposed therebetween, but that a limited lateral movement is possible between the bodies 54 and the pressure plate, since the resilient means 68 of Figure 6 yieldingly urges these bodies away from the pressure plate and towards the clutch plates 50. However, a limited lateral movement is possible, since either or both of the bodies may be forced towards the pressure plate against the resistance of the spring means upon the imposition of a laterally inwardly directed pressure upon the body. Such lateral movement would, of course, carry with it the clutch elements pivotally mounted upon the bodies.

Referring now to Figures 1 and 5, it will be seen that when the differential assembly 26 is rotated by virtue of the power applied thereto, through the ring gear and pinion 34 and 14, that the rotating housing 30, carrying with it the connecting means 60, will impart a driving thrust to one pair of cam surfaces 84 of the notches 82 of the clutch elements, this thrust thereby causing a pivotal movement of the clutch elements about their radial pivot pins 90 in such a direction as to engage one of the ratchet teeth of each of the clutch elements in the corresponding ratchet recesses in the clutch plates. At this time, therefore, as shown in Figure 5, a positive mechanical driving connection is established from the rotating differential housing 30 to each of the driven members 44 through their clutch plates, whereby the rear axles 18 will be positively driven with power being directly and positively coupled to each.

It should be noted at this point that when the direction of rotation of the power means is reversed, as when it is desired to cause backward movement of the vehicle, the opposite rotation of the propeller or drive shaft 12 and the associated gearing will result in opposite rotation of the differential housing 30, thereby causing a reversal of the thrust of the connecting members 60 upon the clutch elements, causing the clutch elements to pivot about their pivot pins and cause their opposite ends or teeth to engage in the clutch plate ratchet recesses. The shape of the clutch teeth is such that the oppositely disposed teeth on the two ends of the clutch elements will engage the clutch plate only in reverse directions of rotation.

Further, in the event that the engine of the vehicle is employed as a brake so that the rear axles 18 rotate at a speed which is faster than the rotation of the propeller shaft 12, the reversing effect previously described will ensue because of the relative reversal of thrust of the connecting member 60 with respect to the clutch elements. Accordingly, the two driven members are positively clutched or locked to the drive shaft for this braking operation.

Assuming now that the clutch members are in the position shown in Figure 5 and one axle, such as that at the right side of the assembly, has a tendency to rotate faster than the other axle, as when the vehicle makes a left turn, it will now be seen that the increased speed of rotation of the axle 18 at the right side will, through its splined connection with the driven member 44 at the right side, cause a relative forward movement or rotation of the clutch plate 50 of the right hand unit. This relative forward movement will cause the edges of the ratchet recesses 52 to slide along the inclined side surfaces of the engaged clutch teeth of the clutch element 72 and cause these clutch elements to pivot about their pivot pins 90, whereby the other of the cam surfaces 84 will engage against the connecting member 60 during this relative rotation, and thereby cause a counter-clockwise pivoting of the right-hand clutch element about its pivot pin, as viewed in Figures 4 and 5, until these clutch elements have their driving teeth disengaged from the clutch recesses and until the position shown in Figure 4 is assumed. It will be apparent that this pivoting movement of the clutch elements and their cam surfaces about the connecting member 60 causes a lateral displacement of the body 54 carrying those clutch elements towards the pressure plate 56, which movement is permitted by the yielding of the resilient means 68.

However, when this relatively increased speed of rotation of the right-hand axle member ceases, the resilient means will again urge the body and its clutch members against the clutch plate from which the same have been laterally displaced until the renewed pressure of the connecting member 60 upon the cam surface of the clutch element will again pivot the same into locking clutched engagement.

From the foregoing, it is believed that the objects of the invention have been attained in an improved, simplified and efficient manner, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is as follows:

1. A differential mechanism comprising a rotatable housing, means for rotating said housing, a pair of driven members journaled in said housing having their adjacent inner ends disposed in axially spaced relation, a body rotatably journaled in said housing upon each driven member, a clutch plate on each driven member, overrunning clutch elements movably mounted on each body, the clutch elements on each body being operatively engageable with the clutch plate adjacent that body, means drivingly connecting said clutch elements to said housing for rotation thereby, a pressure plate in said housing disposed between the adjacent ends of the driven members, resilient means operatively interposed between said pressure plate and said bodies for using the latter towards their adjacent clutch plates.

2. The combination of claim 1 wherein said connecting means secures said pressure plate to said housing for rotation therewith.

3. A differential mechanism comprising a rotatable housing, means for rotating said housing, a pair of drive members journaled in said housing, each adapted to receive and drive an axle, a pair of bodies, each rotatably journaled in said housing upon a driven member, an axial clutch plate on each driven member, radially extending pivot pins mounted on each body, overrunning clutch elements pivotally mounted on each pin, the clutch elements on each body being operatively engageable with the clutch plate adjacent that body, means mounted directly on the periphery of the housing drivingly connecting said clutch elements to said housing for rotation thereby, said clutch elements comprising levers pivoted intermediate their ends to said bodies for rotation about axes radial to the axis of rotation of said bodies, said elements having clutch teeth at their opposite ends respectively engageable with said clutch plates for reverse directions of relative rotation of said housing and said driven elements, said elements having cam surfaces on one side thereof at their midpoint, said connecting means being interposed between and alternately engageable with said cam surfaces.

4. The combination of claim 3 wherein said cam surfaces are disposed in a notch.

JAMES AMOUR.

References Cited in the file of this patent

UNITED STATES PATENTS

| Number | Name | Date |
|---|---|---|
| 1,224,124 | Adler | May 1, 1917 |
| 1,390,420 | Allen | Sept. 13, 1921 |
| 1,434,778 | Harris | Nov. 7, 1922 |
| 1,472,758 | Hulett | Oct. 30, 1923 |
| 1,498,277 | Hulett | June 17, 1924 |
| 1,839,195 | Bowen | Jan. 5, 1932 |
| 2,113,511 | Johnson | Apr. 5, 1938 |